April 19, 1955  H. A. PURSCHE  2,706,438
TONGUE LATCH FOR TWO-WAY PLOW
Original Filed Aug. 8, 1949  2 Sheets-Sheet 1
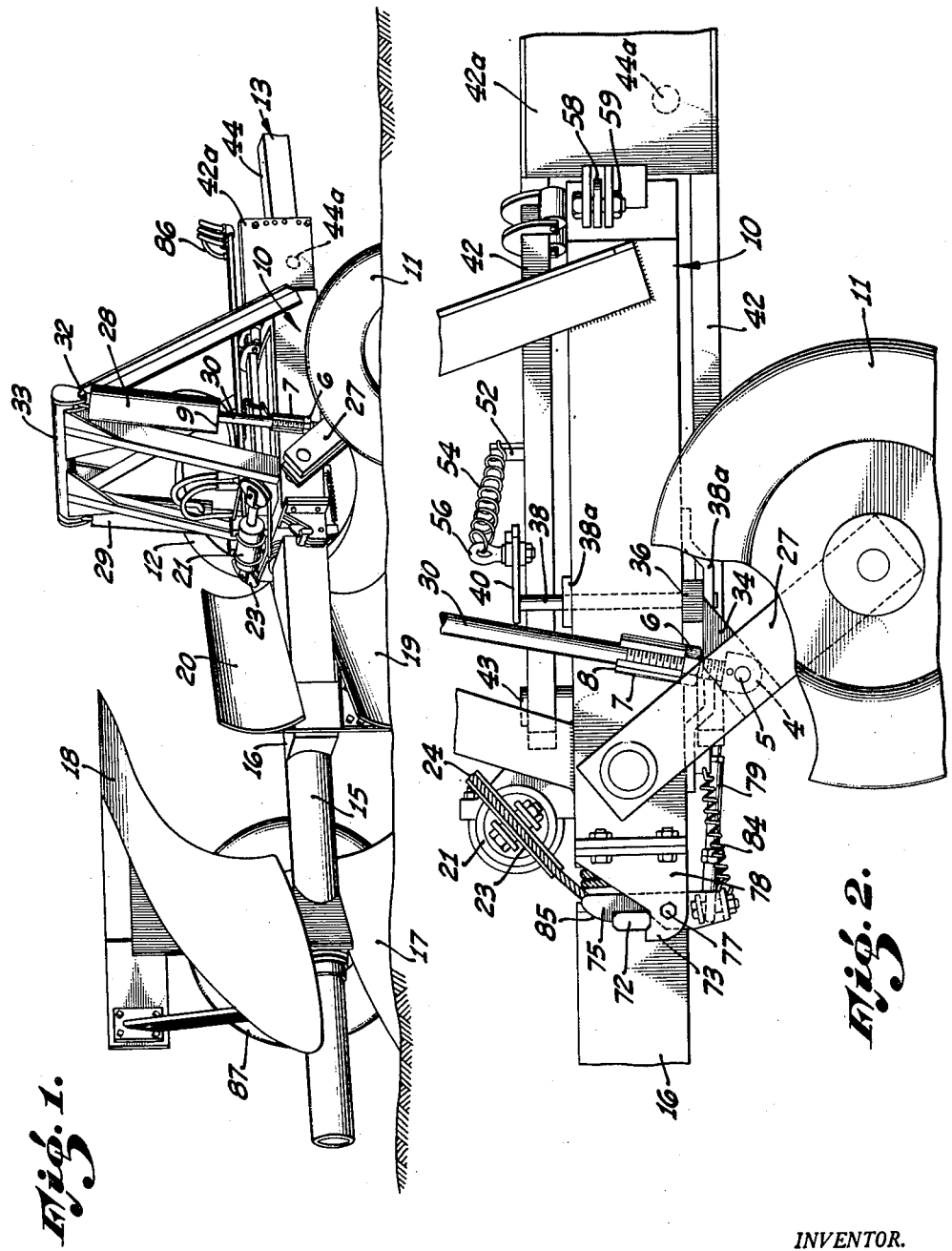
INVENTOR.
HARRY A. PURSCHE
BY
Lyon & Lyon
ATTORNEYS.

April 19, 1955   H. A. PURSCHE   2,706,438
TONGUE LATCH FOR TWO-WAY PLOW
Original Filed Aug. 8, 1949   2 Sheets-Sheet 2

INVENTOR.
HARRY A. PURSCHE
BY
Lyon & Lyon
ATTORNEYS.

United States Patent Office 2,706,438
Patented Apr. 19, 1955

2,706,438

TONGUE LATCH FOR TWO-WAY PLOW

Harry A. Pursche, Gardena, Calif.

Original application August 8, 1949, Serial No. 109,090, now Patent No. 2,655,851, dated October 20, 1953. Divided and this application April 7, 1952, Serial No. 280,977

6 Claims. (Cl. 97—26)

This is a division of my copending application for "Two-Way Plow Construction," Serial No. 109,090, filed August 8, 1949, now Patent No. 2,655,851. This invention relates to agricultural implements and is particularly directed to improvements in a two-way plow construction. In my prior patents, Nos. 2,625,089; 2,625,090 and 2,625,091, I have shown two-way plows having certain novel features of construction and operation. The present application is directed to improvements over the devices shown in those patents.

The principal object of this invention is to provide a single power cylinder assembly operatively connected for shifting the tongue of a wheel-mounted two-way plow, which power cylinder is also effective to latch the tongue in either operative position, to latch the roll-over carrier for the plowshares in either of two operative positions, and also to actuate the mechanism for selectively limiting vertical movement of the ground-contacting wheels with respect to the plow frame. The use of a single power-operated cylinder assembly for performing these various functions simplifies the design of the mechanism for controlling the operation of the two-way plow assembly and reduces the number of actuating parts and hydraulic control lines, resulting in a more simple, rugged design adapted to withstand severe stresses and deflections in service and less apt to get out of order.

Two-way plow assemblies as shown in my prior applications may use right-hand plowshares and left-hand plowshares. When the right-hand plowshares are in use the tongue of the plow assembly is shifted to one position, and likewise the latches for the roll-over carrier and tongue are in a corresponding position. Furthermore, the limit stops for controlling the position of the supporting wheels with respect to the frame are also in a corresponding position since the right-hand supporting wheel rolls in the furrow when the right-hand plowshares are in operation.

When the carrier is shifted to bring the right-hand plowshares out of the ground and to position the left-hand plowshares in plowing position the tongue, tongue latch mechanism, the carrier latch, and wheel elevation control mechanism are all shifted to the other position. It is unnecessary during normal operation of the two-way plow assembly to have individual control of these several mechanisms, and in accordance with my invention a single power cylinder is operatively connected to actuate these several instrumentalities at the same time.

Another object of my invention is to provide a novel form of mechanism for controlling the height of the supporting wheels with respect to the frame.

Another object is to provide tongue-latching mechanism which is anchored to one end of the power cylinder assembly and tongue-swinging mechanism which is connected to the other end of the power cylinder assembly.

Other and more detailed objects and advantages will appear hereinafter.

In the drawings:

Figure 1 is a perspective view of a device embodying my invention, the tongue being broken off and the towing vehicle or tractor omitted.

Figure 2 is a side elevation partly broken away showing details of construction of the plow frame.

Figure 3:
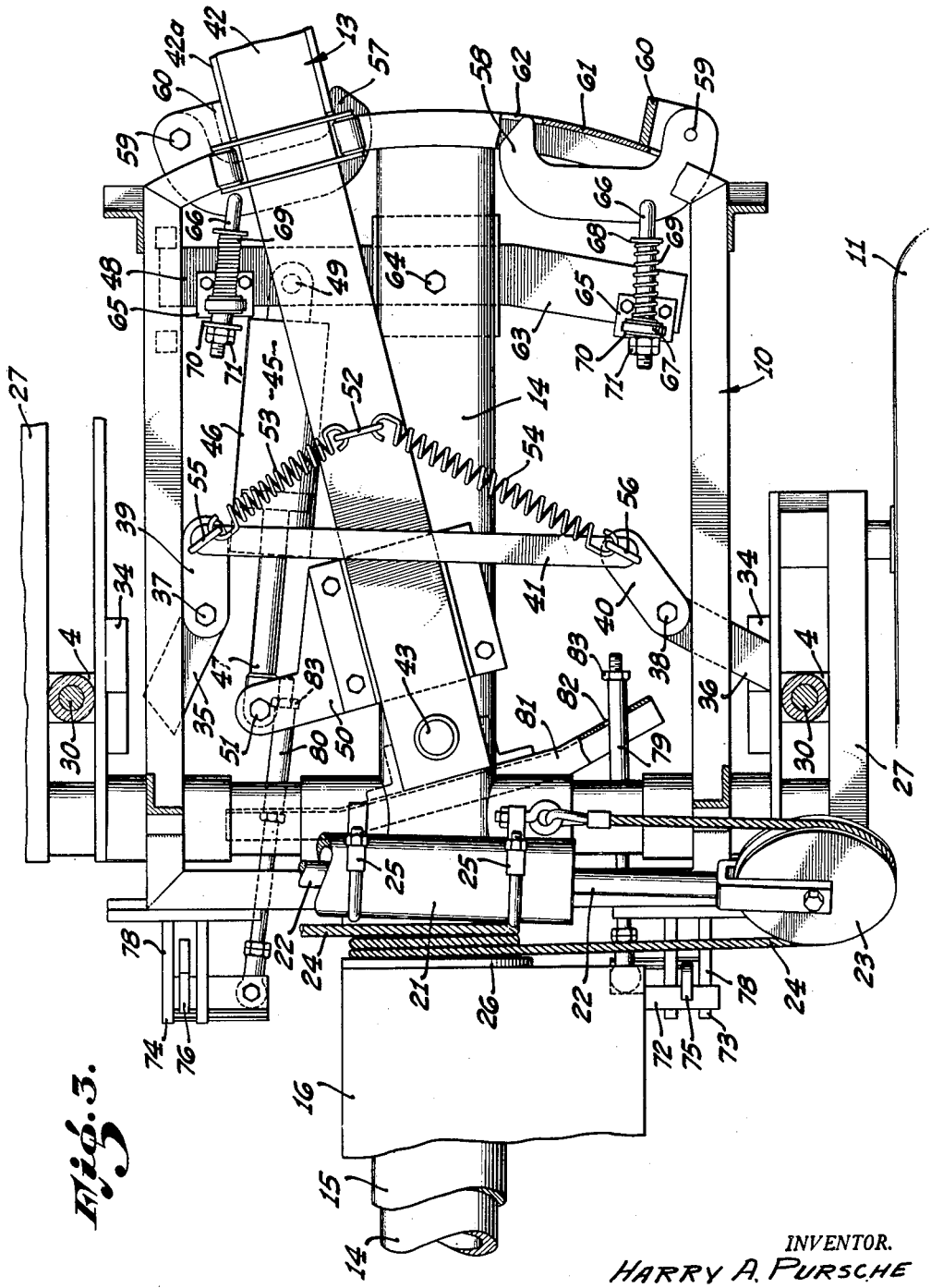
Figure 3 is a plan view partly broken away showing details of construction.

Referring to the drawings, the frame 10 is supported on laterally spaced side wheels 11 and 12 and is towed behind a tractor or other towing vehicle (not shown) by means of a tongue 13. A central longitudinal beam 14 is rigidly secured to and forms a part of the frame 10 and extends rearwardly therefrom in a generally horizontal direction. Rotatably mounted on this stationary beam 14 is a sleeve 15 constituting a portion of a carrier 16. The carrier 16 supports a right-hand plowshare 17 and a left-hand plowshare 18 and also supports a pair of scraper blades 19 and 20. The carrier 16 may be rotated through approximately one-half revolution to bring either plowshare into operative position as desired. Power means are provided for turning the carrier 16, and as shown in the drawings this power means includes a double-ended power cylinder assembly 21 having piston rods 22 extending from opposed ends thereof. A pulley 23 is carried on the end of each of these rods. A flexible cable 24 is anchored at each end by brackets 25 and extends around the pulleys 23 and around the drum 26 formed on the carrier 16. Movement of the piston rods causes the carrier to be swung from one position to the other. This motion of the carrier is accomplished when the frame 10 is elevated to bring the longitudinal beam 14 to a sufficiently high position so that both the plowshares 17 and 18 clear the level of the ground.

Means are provided for raising and lowering the frame 10, and as shown in the drawings this means includes the crank arms 27, each of which is pivotally attached to the frame 10 near the rear end thereof, and which carries one of the side supporting wheels at its forward end. Power cylinder asesmblies 28 and 29 are provided for swinging the crank arms 27, and each is provided with an extensible piston rod 30. Each rod 30 is provided with a block 4 fixed at its lower end, which block is connected to one of the crank arms 27 by a pivot pin 5. A nut 6 is threaded on each rod 30 and a pair of upstanding arcuate bumpers 7 are welded to the nut. The upper ends 8 of the bumpers strike the lower end 9 of one of the cylinder assemblies to limit pivotal movement of its respective wheel arm 27. The assemblies 28 and 29 are each connected by means of a pivot bolt 32 to an A-frame structure 33 attached to the frame 10. The power cylinder assemblies 28 and 29 are hydraulically connected for operation in unison. Since one of the side supporting wheels rolls in the furrow when the right-hand plowshare is in service, and since the other side supporting wheel rolls in the furrow when the left-hand plowshare is in service, means are provided for limiting the extent of movement of the side supporting wheels with respect to the frame 10. In this way the frame 10 is maintained in a substantially horizontal position regardless of which of the side supporting wheels is rolling in the furrow. It will be understood that the other wheel in any case rolls on unplowed ground.

As shown in the drawings, each of the crank arms 27 is provided with a block 34 which is adapted to be engaged by swinging limit stops 35 and 36. Each of these limit stops is carried on a vertical shaft 37, 38 supported for rotation on the frame 10 by means of brackets 38a. Crank arm 39 is fixed to the shaft 37, and similarly, crank arm 40 is fixed to the shaft 38. A tie bar 41 is pivotally connected at its ends to the free ends of the crank arms 39 and 40. Accordingly, shifting of the tie bar 41 serves to extend one of the swinging limit stops 35, 36 and simultaneously to retract the other. When the swinging limit stop 36 is positioned over the block 34 as shown in Figure 3 the angular travel of the wheel supporting crank arm 27 is limted. The limit stop is employed for the particular wheel which rolls in the furrow. When the piston rods 30 are extended to raise the frame 10, both wheels 11 and 12 are lowered to the maximum extent, but when the piston rods 30 are allowed to be retracted into their respective cylinders the crank arm for the furrow wheel engages one of the limit stops 35, 36 so that the other wheel rises with respect to the frame to compensate for the depth of the furrow and to maintain the frame in substantially horizontal position.

In order that the two-way plow device may be properly positioned behind the towing vehicle whether plowing a left-hand furrow or a right-hand furrow, it is essential to employ a swinging tongue. As shown in the drawings, the tongue 13 includes a pair of parallel channel members 42 which is connected to the frame by means of pivot pins 43. A tiltable draft element 44 is connected to the box section 42a at the forward end of the channels 42 by means of a horizontal connecting pin 44a. Means are provided for shifting the tongue about its pivot pin 43, and as shown in the drawings this means includes the power cylinder assembly 45. This assembly includes a hydraulic cylinder 46 having a piston reciprocable therein and connected to a piston rod 47. The cylinder 46 is pivotally connected to a transverse beam 48 by means of pivot pin 49, while the piston rod 47 is connected to the bracket 50 by means of the pivot bolt 51. The bracket 50 is secured to the tongue channel 42 so that when the piston rod is extended as shown in Figure 3 the tongue is shifted to the left, and when the piston rod 47 is retracted the tongue is shifted to the right.

An upwardly extending finger 52 is provided on the tongue element 42, and coil springs 53 and 54 connect this finger with I-bolts 55 and 56 respectively mounted on the opposite ends of the tie bar 41. From this description it will be understood that when the tongue is shifted to the left as viewed in Figure 3 the spring 54 moves the tie bar 41 to the left, thereby extending the swinging limit stop 36 and retracting the swinging limit stop 35. Similarly, when the tongue is shifted to the right, the spring 53 moves the tie bar 41 to the right, thereby retracting the stop element 36 and extending the stop element 35.

Means are provided for latching the tongue in either the right or left position, and as shown in the drawings this means includes a pair of latching lugs 57 and 58 each pivotally connected to the forward end of the frame by means of the pivot pins 59. These pivot pins are attached to stop elements 60 which are welded or otherwise attached to the curved cross-piece 61 at the forward end of the frame 10. Each of the pivoted latching lugs 57 and 58 is adapted to extend between the upper and lower channels 42 of the tongue structure and to engage one of the side plates forming the box section 42a. The curved cross-piece 61 is provided with openings 62 through which the swinging ends of the latching lugs 57 and 58 may pass toward latching position. Means are provided for simultaneously actuating the latching lugs so that one is retracted and the other is extended, and as shown this means includes a latching bar 63 pivotally connected to the beam 14 by means of the pivot bolt 64. A bracket 65 is secured on each of the ends of the bar 63, and actuating rods 66 extend through an eye 67 provided on each of the brackets 65. A washer 68 fixed to each actuating rod forms a stop for one end of a coil spring 69 securing a portion of the actuating rod. The other end of the spring rests against the eye 67. The actuating rods are each pivotally connected to one of the latching lugs 57 and 58. From this description it will be understood that when the latching bar 63 is pivoted about the bolt 64 one of the latching lugs is positively retracted and the other is urged by its spring 69 toward latching position. A washer 70 and locking nuts 71 are provided near the ends of the actuating rods 66 to form an abutment cooperating with the eye 67 on the bracket 65 to retract the actuating rod and locking lug.

The pivotal connection 49 for the power cylinder assembly 46 is attached to the latching bar 63 so that when the piston rod is extended the reaction force tends to pivot the latching bar 63 in a clockwise direction as viewed in Figure 3. When the piston rod 47 is retracted the reaction force on the pivotal connection 49 swings the latching bar 63 in a counterclockwise direction, thereby retracting the latching lug 57 and resiliently urging the latching lugs 58 toward latching position.

As set forth in my prior application, Serial No. 18,252, now Patent No. 2,625,089, it is desirable to latch the rollover carrier 16 with respect to the frame so that the right-hand plow or the left-hand plow is firmly latched in position. In order to accomplish this result I provide a protuberance 72 on the carrier 16 which is adapted to engage stops 73 on one side of the frame or stops 74 on the other side. Pivoted latching fingers 75 and 76 are provided adjacent the stops 73 and 74. As best shown in Figure 2, these latching fingers are pivotally supported at 77 on brackets 78 which form the limit stops. Actuator rods 79 and 80 are pivotally connected to the lower ends of the latching fingers 75 and 76 respectively, and these rods are arranged to be actuated by a cross-member 81 fixed on the end of the upper channel 42 of the tongue structure. The member 81 is provided with openings 82 through which the latching bars 79 and 80 extend. Spaced nuts 83 on each of the actuating bars are arranged to be contacted by the member 81. Accordingly, swinging movement of the tongue with respect to the pivot 43 results in moving one of the latching fingers 75, 76 toward latching position and retracting the other away from latching position.

Each of the latching fingers 75 and 76 may be provided with a spring 84 which acts to pivot the latching finger toward latching position. The upper end 85 of each latching finger is rounded or bevelled so that the latching protuberance 72 may deflect either latching finger sufficiently to engage the stops 73 or 74.

In operation the two-way plow assembly may be towed behind a tractor or other towing vehicle to the field where the plowing is to take place. During the towing operation the power cylinder assemblies 28 and 29 are fully extended so that the frame 10 is raised clear of the ground for a maximum extent. When the frame is in its fully elevated position the plowshares 17 and 18, as well as the scrapers 19 and 20, clear the ground level for convenient transportation. When the field to be plowed is reached the operator actuates suitable hydraulic control valves on the towing vehicle, which valves are connected to control operation of the power cylinder assemblies on the two-way plow through hydraulic connection 86. The power cylinder assemblies 28 and 29 may be positively actuated to extend or retract their respective piston rods 30. The depth of the furrow is regulated by changing the position of the adjusting nuts 6 on the piston rods 30. One of the plowshares 17 or 18 enters the ground as the plow assembly is towed behind the tractor. One of the scrapers acts to remove weeds and other trash which might interfere with proper actuation of the main plowshare.

During the plowing operation the tail wheel 87 which is mounted on the carrier 16 rolls on the unplowed ground and controls the depth of the furrow as set forth fully in my copending applications. A furrow is made for the length of the field, and when the end of the field is reached the power cylinder assemblies 28 and 29 are pressurized to lift the frame and plowshare out of the ground and to lift the tail wheel 87. The double-ended power cylinder 21 is then actuated to roll the carrier 16 to bring the other plowshare into operative position with regard to the frame 10. The tractor and plow are then turned around and proceed back along the furrow previously made with one of the side wheels 11 or 12 rolling in the furrow and the other rolling on unplowed ground. One of the swinging limit stops 35, 36 is extended adjacent the wheel which rolls in the furrow so that the frame 10 is maintained substantially in level position. This limit stop is extended when the tongue assembly 13 is shifted by means of the power cylinder assembly 46. As set forth hereinabove, shifting of the tongue 13 is accomplished by latching of the tongue in its new position, projecting of the proper limit stop 35, 36, and automatic latching of the carrier 16 in its new position. As the tractor and plow proceed across the field the forward portion 44 of the draft tongue assembly 13 is free to swing vertically about the horizontal pivot pin 44a so that no vertical load is imposed on the tractor and so that the plow rolls on its three supporting wheels independently of vertical motion of the tractor.

Having fully described my invention, it is to be understood that I do not wish to be limited to the details herein set forth, but my invention is of the full scope of the appended claims.

I claim:

1. In a two-way plow assembly, the combination of a mobile frame, a draft tongue, pivot means connecting the draft tongue to the frame, whereby the tongue may have substantially horizontal swinging movement relative to the frame, means for latching the tongue to the frame in either of two positions, the latch means including a pair of latching lugs pivotally mounted on the front portion of the frame, a latch actuating bar operatively connected to said latching lugs for moving one toward latching position while retracting the other from latching position and vice versa, and a power cylinder assembly having a piston element and a cylinder element, one element being connected to the draft tongue and the other to the latch actuating bar, whereby the draft tongue may be swung to either position and latched in that position.

2. In a two-way plow assembly, the combination of a mobile frame having a stationary longitudinal beam, a draft tongue, pivot means connecting the draft tongue to the beam near the rear of the frame, whereby the tongue may have substantially horizontal swinging movement relative to the frame, means for latching the tongue to the frame in either of two positions, the latch means including a pair of latching lugs pivotally mounted on the front portion of the frame, a latch actuating bar pivoted on said beam and operatively connected to said latching lugs for moving one toward latching position while retracting the other from latching position and vice versa, and a power cylinder assembly having a piston element and a cylinder element, one element being connected to the draft tongue and the other to the latch actuating bar, whereby the draft tongue may be swung to either position and latched in that position.

3. In a two-way plow assembly, the combination of a mobile frame having a stationary longitudinal beam, a draft tongue, pivot means connecting the draft tongue to the beam near the rear of the frame, whereby the tongue may have substantially horizontal swinging movement relative to the frame, means for latching the tongue to the frame in either of two positions, the latch means including a pair of latching lugs pivotally mounted on the front portion of the frame, a latch actuating bar pivoted on said beam and operatively connected to said latching lugs for moving one toward latching position while retracting the other from latching position and vice versa, a power cylinder assembly, one end of said assembly being pivotally connected to the latch actuating bar and the other end being pivotally connected with respect to the draft tongue, whereby the draft tongue may be swung to either position and latched in that position.

4. In a two-way plow assembly, the combination of a mobile frame, a longitudinal beam member fixed on the frame and extending rearwardly thereof, a draft tongue having a bifurcated portion, pivot means connecting the bifurcated portion to said beam member so that the tongue may straddle the beam member, the tongue having a forward section connected to the bifurcated portion, laterally spaced stop elements on the frame limiting swinging movement of the tongue, latch means for holding the tongue against either of said stop elements, said latch means including a pair of latching lugs each pivotally connected to the frame for horizontal swinging movement, the latching lugs each having a portion extending toward the center line of the frame and adapted to project through the bifurcated portion of the tongue, each of the latching lugs having an abutment on the projecting portion for engaging a side surface of said forward section of the tongue.

5. In a two-way plow assembly, the combination of a mobile frame having a stationary longitudinal beam and provided with an arcuate front member, a bifurcated draft tongue having upper and lower legs straddling said beam, pivot means connecting said legs to the beam whereby the tongue may have substantially horizontal swinging movement relative to the frame, stop elements on said arcuate front member limiting the swinging movement of the tongue, latch means for latching the tongue against either of said stop elements, said latch means including a pair of latching lugs pivotally mounted on the frame in advance of said arcuate front member, the latching lugs each having an extending portion adapted to project between the legs of the bifurcated portion of the tongue, the tongue having a section joining the legs at a position in advance of the arcuate front member, each of the lugs having an abutment for engaging a side surface of said section, and a roller on the tongue adapted to roll on the arcuate member.

6. In a two-way plow assembly, the combination of: a mobile frame, a draft tongue, pivot means connecting the draft tongue to the frame, whereby the tongue may have substantially horizontal swinging movement relative to the frame, means for latching the tongue to the frame in either of two positions, the latch means including a pair of latching lugs pivotally mounted on the front portion of the frame, a latch actuating bar centrally pivoted on said frame, means connected to the actuating bar for moving one of said latching lugs toward latching position while retracting the other from latching position and vice versa, and a power cylinder assembly having a piston element and a cylinder element, one element being connected to the draft tongue and the other to the latch actuating bar, whereby the draft tongue may be swung to either position and latched in that position.

References Cited in the file of this patent

UNITED STATES PATENTS

| | | |
|---|---|---|
| 1,908,095 | York | May 9, 1933 |
| 1,915,844 | York | June 27, 1933 |
| 2,136,911 | Briscoe | Nov. 15, 1938 |
| 2,188,413 | Markel | Jan. 30, 1940 |
| 2,316,397 | Briscoe | Apr. 13, 1943 |
| 2,327,927 | Orelind | Aug. 24, 1943 |
| 2,625,091 | Pursche | Jan. 13, 1953 |
| 2,655,851 | Pursche | Oct. 20, 1953 |

FOREIGN PATENTS

| | | |
|---|---|---|
| 466,400 | Great Britain | May 27, 1937 |
| 494,750 | Great Britain (Published 1938; complete spec. not accepted) | |
| 708,918 | France | May 5, 1931 |
| 715,047 | Germany | Dec. 12, 1941 |